May 22, 1951 — D. C. EVANS — 2,553,757
HOLDER FOR SPUN SUGAR CANDY
Filed Feb. 28, 1949
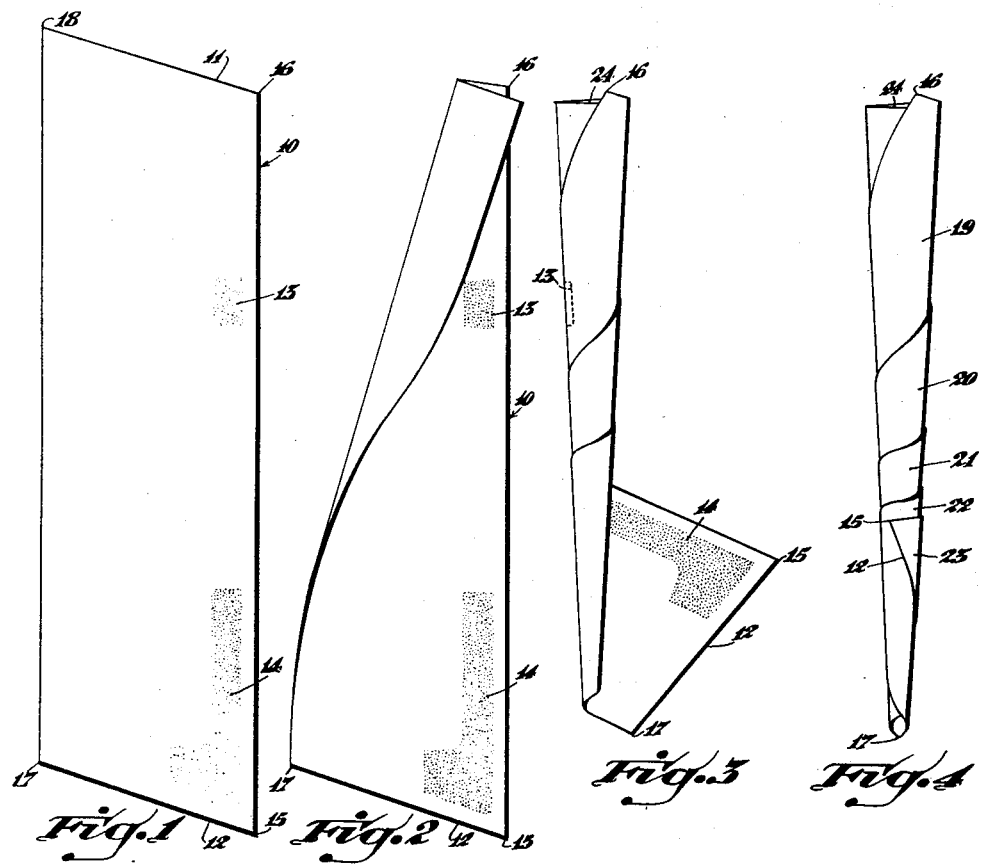
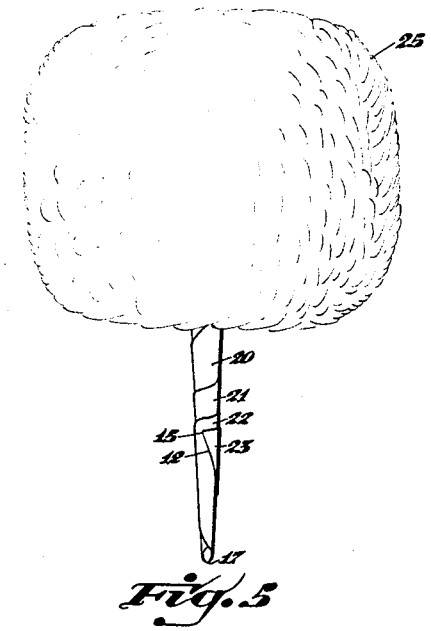
INVENTOR.
David C. Evans
BY Wood, Arey, Herron & Evans
ATTORNEYS Patented May 22, 1951

2,553,757

UNITED STATES PATENT OFFICE 2,553,757

HOLDER FOR SPUN SUGAR CANDY

David C. Evans, Cincinnati, Ohio

Application February 28, 1949, Serial No. 78,870

3 Claims. (Cl. 99—138)

This invention relates to a dispensing receptacle or holder for spun sugar candy and is particularly concerned with a conical structure formed from sheet material, such as paper or the like, adapted to contain or support a quantity of such candy while it is being eaten and to be thrown away after use.

Spun sugar candy, or "cotton" candy as it is sometimes called, is sold extensively at circuses, fairs, carnivals and amusement parks. It is conventionally manufactured in a display stand in the presence of the purchaser on a rapidly rotating drum into which liquid sugar is fed and then heated. The rotation of the drum spins the sugar into a fluffy mass and deposits it on the periphery of a bowl or tub in which the drum is mounted. The candy is then dispensed directly to purchasers by an attendant who operates the machine and retails the candy simultaneously.

It has been the conventional practice in the past to use as the dispensing medium conical holders or cornucopias made up in advance by hand from sheet material, such as paper or the like. While there may be similar types of containers in which adhesive has been used, the universal practice in containers having this particular utility has been to roll the rectangular blank into conical configuration and then to twist the lower or narrowest end to hold the convolutions together during the period when the candy is being dispensed and eaten by the purchaser. In many instances, attendants have developed the habit of moistening their fingers with saliva prior to making the final twist, thereby creating an obviously unsanitary condition.

Generally speaking, little consideration has been given to the construction or assembly of this particular type of container and under the hit and miss procedures which have been followed, there have been many objections to the structures which have been commonly in use. In many instances, they have been found to be insufficiently strong and rigid even for the temporary purpose intended. This results partly from the fact that the convolutions of the sheet material have been spaced evenly without any provision having been made for reinforcement. The failure to use adhesive causes a large percentage of holders to collapse in use, frequently causing the candy to drop on the ground. The holders of the prior art have not been very effective when used to scoop a small quantity of candy from the mass in accordance with the general practice because the open end of the cone is quite small as compared with the mass of candy which it must support and as constructed in the past, the lip of the cone has not engaged well with the candy. Additionally, hand made holders have been difficult for the attendant to handle when nested together because of the lack of a uniformly configurated tab or point on the outermost cone which can be utilized to disengage that cone from the nested stack.

Having in mind the correction of some of the difficulties peculiar to this particular type of structure, it has been one of the objects of the present invention to provide a cone or holder for spun candy which is much stronger and more rigid than those that have been conventionally provided by the prior practices.

Another object has been to provide a holder in which a minimum amount of adhesive is utilized, but the adhesive is so spotted that it effectively holds together the convolutions of the holder during any reasonable amount or type of use.

Another object has been to provide a holder in which the upper lip is so configurated that it readily picks up a quantity of candy from the mass during a dispensing operation and secures it in position on the cone as it is being eaten.

Another object has been to provide a holder in which the narrow end is open and is configurated to provide a tab or tip which may be readily pinched and held by the attendant in disengaging one holder from a nested stack.

Other and further objects and advantages will be apparent from the further and more detailed description of a preferred embodiment of the invention when considered in conjunction with the drawings in which:

Figure 1 is a top plan view of the blank from which the completed holder is formed with adhesive spots indicated thereon in dotted areas.

Figure 2 is a view similar to Figure 1 illustrating the first step in the winding of the holder to spiral or conical configuration.

Figure 3 is a side elevation of the holder entirely wound except for the last convolution.

Figure 4 is a side elevation of a completed holder.

Figure 5 is a side elevation of a holder similar to Figure 4 with a quantity of spun candy positioned thereon.

Figure 6 is a similar view of a stack of holders in nested position.

In the drawings and particularly in Figure 1, the blank from which the holder is formed is designated generally as 10. As illustrated, the upper edge 11 and the lower edge 12 are preferably cut on a bias. The upper adhesive area, which may preferably be small and of generally rectangular configuration, has been designated generally as 13. The lower adhesive area, which is preferably of a general V configuration with the sides of the V running along a side and bottom edge of the blank, is substantially larger than the upper area and has been designated 14. For convenience in the description, the four corners of the blank have also been given numbers, the lower right hand corner being designated 15, the upper right hand corner 16, the lower left hand corner 17 and the upper left hand corner 18.

As illustrated generally in Figures 2-4, the holder is formed by winding the blank convolutely in the general manner indicated and by securing certain of the convolutions to preceding ones by adhesive at the points indicated. As disclosed in Figure 3 particularly, it will be noted that the convolutions are secured together at one point only in the area constituting the upper half of the holder, but are secured by adhesive extending over substantially an entire convolution at a point toward the lower end of the holder where strength is most needed.

It will also be observed from Figures 3 and 4 that as the blank is wound spirally, the pitch angle of the spiral progressively decreases from the large end of the cone to the small end with the result that the marginal overlapping increases progressively as the diameter of the cone is decreased. This is particularly illustrated in Figure 4 in which the convolutions have been designated progressively 19 through 23 from the large end of the cone toward the small. As shown, these convolutions are formed progressively at decreasing pitch angles and the marginal overlap progressively increases, thereby providing a structure which is in effect reinforced at the lower or narrow end where the structure is inherently weakest. The exact degree of lessening of the pitch angle during winding is not critical to the invention, but it is contemplated generally that there will be more convolutions in the lower half of the holder than in the upper half.

From a consideration of Figures 3 and 4, it will be observed that after the spiral winding has been completed in the manner described, the upper right hand corner of the blank, designated 16, extends above the lip of the completed holder forming a tip or projection which, both alone and in conjunction with the adjacent portion 24 of the lip, provides an effective scoop surface for dipping the desired quantity of candy 25 from the mass in the dispensing operation. In most instances, a portion of the candy becomes engaged between this tip 16 and the surface 24, thereby securing the candy to the holder more firmly than in structures where the lip is smooth and even.

It will also be noted that in the spiral winding operation, the lower left hand corner 17 forms a downwardly depending tab which the attendant may readily pinch between the thumb and forefinger in disengaging the outermost holder from a stack of nested holders, such as is illustrated in Figure 6. This is a particular problem in structures of this type because when nested there is frictional engagement over such a large area that disengagement is particularly difficult.

The structure of the invention is particularly, although not necessarily, adapted to machine manufacture in large quantities but whether the manufacture is by machine or by hand, it will be seen from the foregoing description that a definitely superior container has been provided.

Obviously, the exact disposition and configuration of the adhesive areas, which has been illustrated, is not critical nor is the exact degree of angularity at which the blank is wound.

Having fully described my invention, I claim:

1. A blank for forming a holder for spun sugar candy, comprising; a strip of sheet material of substantially parallelogram configuration, a relatively small adhesive area in the upper half of the blank adjacent a side edge thereof, and a larger adhesive area in the lower half of the blank, said larger adhesive area being of general V configuration and extending continuously along a side edge and end edge of the blank, whereby upon convolute winding of the blank into a cone the convolutions will be secured together at one point only in the upper half of the cone but will be secured over the area of substantially an entire convolution in the lower half.

2. A holder for spun sugar candy, comprising; a parallelogram of strip material wound convolutely upon itself into a cone which is open at both ends, one corner of the strip being extended above the lip of the cone to form an angular projection which in conjunction with an adjacent edge of the next inner convolution engages with the candy in separating a portion from the mass, the opposed corner of the strip on the same side being depended below the apex of the cone to provide a tab for grasping the outermost cone in a nested stack for separating said cone from the stack.

3. A holder for spun sugar candy, comprising; a parallelogram of strip material wound convolutely upon itself into a cone which is open at both ends, the pitch angle of the convolutions being progressively decreased from the large end of the cone to the small end of the cone to provide a greater number of convolutions in the half of the cone toward the small end than in the half of the cone toward the large end, the convolutions in the upper half being adhesively secured together at one point only, the convolutions in the lower half being adhesively secured together over the area of substantially an entire convolution.

DAVID C. EVANS.

REFERENCES CITED

The following references are of record in the file of this patent:

UNITED STATES PATENTS

| Number | Name | Date |
| --- | --- | --- |
| 2,218,525 | Decker | Oct. 22, 1940 |
| 2,363,503 | Decker | Nov. 28, 1944 |